Aug. 18, 1959
F. E. GILMORE
2,900,312
FRACTIONATION
Filed Oct. 16, 1957
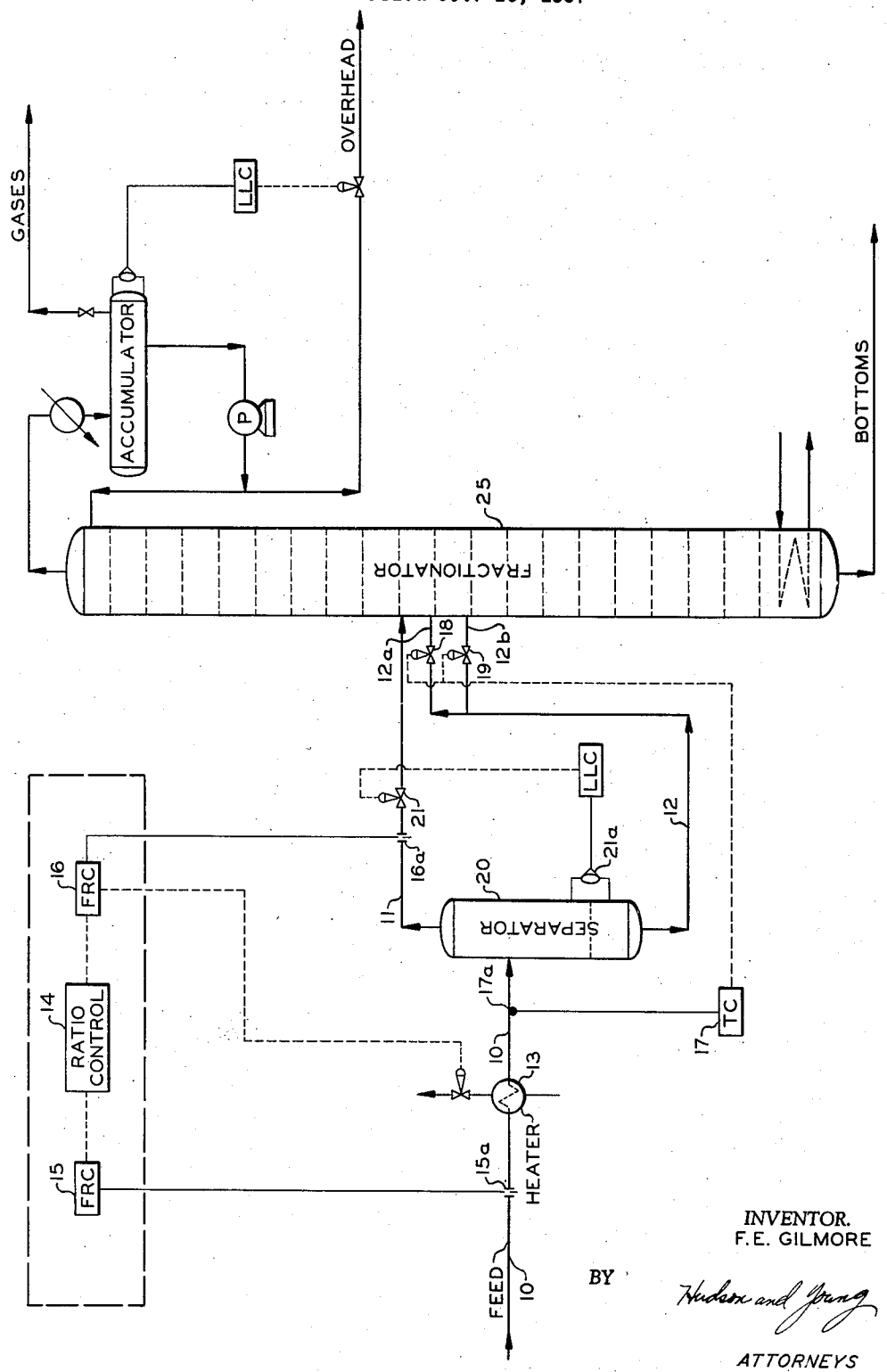
INVENTOR.
F. E. GILMORE
BY *Hudson and Young*
ATTORNEYS

United States Patent Office 2,900,312
Patented Aug. 18, 1959

2,900,312

FRACTIONATION

Forrest E. Gilmore, Bartlesville, Okla., assignor to Phillips Petroleum Company, a corporation of Delaware Application October 16, 1957, Serial No. 690,570

4 Claims. (Cl. 202—160)

This invention relates to fractionation. In one of its aspects, the invention relates to a method and means for fractionation of a feed which contains both liquid and vapor in which the vapor and liquid in the feed are separated in a separation zone and are separately fed to different levels in a fractionation tower, column or zone, the liquid level in the separation zone being automatically maintained by removing more vapor from said zone when the liquid level falls therein and vice versa, the feed to said zone being heated, the heat input to the feed to said zone being automatically increased when vapors flowing from the separation zone to the fractionation tower or zone decrease and vice versa, and the control of the heat responsive to vapor flow from said separation zone to the fractionation tower or zone being reset responsive to the flow of feed to the system to maintain constant the ratio of flow of vapors and liquid to said tower. In another of its aspects, the invention relates to feeding the liquid from the vapor-liquid separation zone to a higher level in the fractionation zone when its temperature decreases and to a lower level in said zone when its temperature increases in the aforesaid operation. In still another of its aspects, the control means of the invention is adjusted to the highest vapor-to-liquid mol ratio flow which the tower can tolerate without loss of efficiency.

Although it can be said that theoretically the feed to a fractionator column should not contain any vapor, plant experience and present practice show that somewhere in excess of about 10 mol percent vapor, even as high as about 13 mol percent vapor, can be in some feeds with practically no apparent change or loss in tower operation efficiency. Since the feed is partly vapor, the load on the fractionation tower reboiler, and, therefore, its size and steam consumption, are decreased. Thus, it is known to be advantageous to charge some vapor with the liquid feed and to use heat obtained elsewhere to heat up the feed outside of the tower, thus to reduce the load on the tower reboiler. Such pre-heat of the feed to render it partly vaporous is advantageous since there are generally available streams which require cooling and from which the heat can be extracted by indirect heat exchange. The present invention is directed to the type of system wherein an optimum maximum mols of vapor to mols total feed is controlled.

It is an object of this invention to provide a fractionation method and means. It is another object of this invention to provide a fractionation method and means wherein there is automatically maintained a pre-set mol ratio of vapor to total feed to a fractionator, wherein the feed rate resets the vapor demand to maintain said ratio and the vapor flow controls the amount of heating of the feed and wherein the temperature of the feed controls the point of introduction of substantially vapor-free liquid to the fractionation zone or tower.

Other aspects, objects and several advantages of this invention are apparent from a study of this disclosure, the drawing and the appended claims.

According to this invention, there are provided a method and means of fractionating a feed and automatically maintaining a pre-set mol ratio of vapor and liquid to a fractionation zone in which said feed is being fractionated which comprises passing said feed, at a flow rate which is measured, through a controlled heating zone, detecting the temperature of said feed when it has passed through said heating zone, passing said feed to a liquid-vapor separation zone, removing liquid from said last zone and passing said liquid to the fractionation zone by way of a plurality of liquid feed entries to said fractionation zone at different levels therein, adjusting the amount of liquid fed to said fractionation zone through any of said entries responsive to the temperature earlier detected, removing vapor from said separation zone and passing said removed vapor to said fractionation zone, controlling the liquid level in said separation zone by adjusting the rate of flow of vapor from said separation zone to said fractionation zone, detecting the rate of flow of vapors from said zone to said fractionation zone, controlling heat input to said heating zone responsive to said rate of flow of vapors and resetting the control of heat input responsive to said flow rate of the feed which is measured. The resetting of the control of heat input will be to increase the amount of heat input when the feed flow increases and vice versa.

The invention is broadly applicable to the fractionation of various fractionatable liquids. The principle of its operation is essentially the same regardless of the chemical composition of the liquid which is supplied to the system. Therefore, the invention is fully described in connection with a specific embodiment thereof in which a hydrocarbon mixture, part of which is fed to the fractionator as vapor.

Referring now to the drawing, 10 is a feed line through which a preheated feed is passed to a liquid-vapor separation tank 20 from which vapors are fed to a fractionator 25 by way of pipe 11 and from which liquid is fed to the fractionator by way of pipe 12 and its branch pipes 12a and/or 12b. 13 is a trim heater. 16 is a flow recorder controller which adjusts the heat input to heater 13 responsive to the flow of vapor through flow detector 21 in pipe 11. 17a is a temperature sensitive element operatively connected to temperature controller 17 which in turn operates valves 18 and 19 responsive to the temperature of the feed in pipe 10. 21a is a liquid level sensitive device which controls valve 21 in vapor pipe 11. Finally, 15 is a flow recorder controller which is responsive to flow rate detector 15a in pipe 10. Flow recorder controller 15 operates ratio controller 14 which resets flow recorder controller 16 according to variation of flow of the feed in pipe 10.

The invention is now described in connection with a specific variation of a specific operation in which a constant quantity of feed is being passed to the system but in which the quality of the feed changes in that the feed becomes heavier. After the description about to be made, the invention will be described in the same specific operation in which the original quality of the feed remains constant but the quantity thereof changes.

Referring again to the drawing and to the tables below, a constant quantity of feed is passed by pipe 10 at a rate of 100-pound mols per hour to heater 13. The system is pre-set to operate at a mol ratio of 1-to-10 vapor to total feed. Thus, pipe 11 carries 10 mols of vapor and pipe 12 carries 90 mols of liquid as is desired after the feed is flashed in tank 20. Please see the table, column A. With the constant rate of flow of the feed as above indicated, the feed becomes heavier and at the same 100-pound mols per hour charge rate, there is at this moment insufficient heat transferred by exchanger 13 to provide the required 10 mols per hour of vapor in pipe 11 for the 1-to-10 ratio which has been pre-set. Therefore, the vapor flow in pipe 11 tends to drop and the lower vapor flow is detected by flow meter or orifice 16a which causes, via controller 16, an increase of flow of heating medium through heat exchanger 13 until once again the desired mol ratio of 1-to-10 is established. Please see the table, column B. The additional heating of the heavier charge material to produce 10 mols of vapor causes an increase in the temperature of the feed material downstream of heater 13 since the higher temperature producing the 10 mols of vapor from the same original 100 mols quantity of feed, as explained, is due to the heating of the now heavier feed in pipe 10. Also, the produced vapor is heavier than the originally produced vapor. The increase in temperature is sensed by temperature controller 17 by way of temperature detector 17a which causes a shutting of valve 18 originally opened and the opening of valve 19 so that the now-heavier liquid from tank 20 will be charged to a lower point in the tower at which a composition of liquid is about the same as the composition of the said heavier liquid from tank 20. Thus, by the above operation, the 100 mols per hour of heavier feed produces 10 mols of heavier vapor and 90 mols of heavier and warmer liquid which is passed to a new lower point in the column and the original pre-set 1-to-10 mol ratio of vapor to total feed has been reestablished. A plurality of valves like 18 and 19 can be employed in as many branch pipes but are not shown for sake of simplicity of the drawing. Furthermore, it is possible to so arrange the valves in their control that, say, valve 18 would not be completely closed at a time when valve 19 would not be completely open, etc.

With the original quality of feed constant but an increase in the quantity, the following operation occurs: The total feed increases from, say, 100 to 110 mols per hour. In this example, this increased rate of flow is sensed by flow controller 15 which is responsible to flow meter orifice 15a in pipe 10. In order to maintain the 1-to-10 pre-set mol ratio, controller 15 resets flow controller 16 by way of ratio controller 14 for 110/10 or 11 mols per hour vapor. Please see table, column C. Also, a 110 mols is heated in exchanger 13, there is, at first, insufficient heat to produce 11 mols of vapor, the total heat being used to produce vapor and to heat up the extra amount of liquid. This lower than desired vapor flow in line 11 is detected by way of 16a and flow recorder controller 16 which actuates the control valve on the heating medium to the heater 13. Additional heating medium flows to heat exchanger 13 until the 1-to-10 mol ratio, that is, 11 mols of vapor to 110 mols of feed, is reestablished. Since the 110 mols of feed is the same quality as the original feed, the temperature sensed by temperature controller 17 is constant and the valve 18 will remain open to flow liquid to the tower at the same level or location therein. At this time, because of the larger volume, more total heat is contained in the feed in line 10 downstream of heater 13.

It is obvious that if both quantity increase and feed becoming heavier occur at the same time, the temperature of the feed will increase, as compared with the original feed, and valve 19 will be opened as valve 18 is closed to introduce the heavier liquid to the proper tray.

Other operations, for example, lighter feed at the same quantity as the original quantity, or less feed of the original quality or a combination of less feed of lighter composition, etc. will now be understandable from the above descriptions and the operation or operations described, and, therefore, are not here described but are clearly to be understood to be included within the scope of the operation of the method and apparatus according to the invention.

Flow recorder controller 15, ratio controller 14, and flow recorder controller 16 which are shown included in the dashed line box or rectangle in the drawing is a ratio controller known in the art and is readily available from the Foxboro Company. This instrument, per se, forms no part of the present invention. Such an instrument is shown as model 40 ratio controller in Foxboro Bulletin 381 on page 11 thereof.

*Table I*

(A)

| Component in Stream | # Mol/Hr. | | |
|---|---|---|---|
| | Original Feed (10) | Original Vapor (11) | Original Liquid (12) |
| $C_2$ | 2 | 2 | |
| $C_3$ | 25 | 8 | 17 |
| $C_4$ | 25 | | 25 |
| $C_5+$ | 48 | | 48 |
| Total | 100 | 10 | 90 |
| Ratio, V/Feed (mols.) | 1 to 10 | | |

(B)

| Component in Stream | # Mol/Hr. | | |
|---|---|---|---|
| | Heavier Feed (10) | Heavier Vapor (11) | Heavier Liquid (12) |
| $C_2$ | 1 | 1 | |
| $C_3$ | 23 | 9 | 14 |
| $C_4$ | 26 | | 26 |
| $C_5+$ | 50 | | 50 |
| Total | 100 | 10 | 90 |
| Ratio, V/Feed (mols.) | 1 to 10 | | |

(C)

| Component in Stream | # Mol/Hr. | | |
|---|---|---|---|
| | More of Orig. Feed (10) | More of Orig. Vapor (11) | More of Orig. Liquid (12) |
| $C_2$ | 2.2 | 2.2 | |
| $C_3$ | 27.5 | 8.8 | 18.7 |
| $C_4$ | 27.5 | | 27.5 |
| $C_5+$ | 52.8 | | 52.8 |
| Total | 110.0 | 11.0 | 99.0 |
| Ratio, V/Feed (mols.) | 1 to 10 | | |

In the foregoing tables, the feed temperature in separator 20 of a debutanizer operating at 175 p.s.i.a. is maintained at about 218° F. until the feed becomes different. Then, with the variations in quality of the feed, the temperature at 17a varies in the ranges 224° F. to 228° F. In any event, the tower top temperature which is controlled, by conventional means not shown, is maintained at about 150° F. The tower bottom temperature is maintained at about 340° F. The hydrocarbon feed is a light, partially deethanized natural gasoline.

The tower in this example is 100 feet high, 30 inches in diameter, contains 40 trays and with the pre-set ratio of vapor to liquid feed experiences no significant fractionation loss, yet the advantage of being able to preheat the feed to the maximum possible extent without loss of efficiency of the tower is secured due to the operation according to the invention.

Reasonable variation and modification are possible within the scope of the foregoing disclosure, the drawing, and the appended claims to the invention, the essence of which is that a constant maximum optimum pre-set mol ratio of vapor to feed fed to a fractionator from a liquid-vapor separation zone or vessel is maintained without measurable loss of fractionation efficiency due to change in feed quantity and/or quality by heating the feed to the liquid-vapor separation zone responsive to flow of vapor therefrom, maintaining the liquid level in the liquid-vapor-separation zone constant by regulating flow of vapor therefrom, and resetting the rate of flow of heat to a heater in which the feed to the liquid-vapor separation zone is heated responsive to the total flow of feed to said liquid-vapor separation zone, in a preferred form flowing liquid from the liquid-vapor separation zone to different elevations in the fractionation tower depending upon the temperature of said liquid.

I claim:

1. A vapor-liquid fractionating apparatus comprising, in combination, a fractionator tower having an overhead vapor discharge pipe and a bottoms liquid draw-off pipe, a vapor-liquid separator tank, a vapor pipe from said tank to said tower, a liquid feed pipe from said tank to said tower, at least one branch on said liquid feed pipe to said tower, a liquid level controller operatively installed in said tank, a vapor flow control valve in said vapor pipe from said tank to said tower operatively connected and responsive to said liquid level controller, a liquid flow control valve in each of said liquid feed pipe from said tank to said tower and in said branch of said feed pipe, a liquid-vapor feed pipe for feeding fractionation feed to said tank, a flow rate detector, a heater and a thermoresponsive element in said last-mentioned pipe, said thermoresponsive element being connected to a temperature controlled valve actuator, said actuator being connected to each of said valves in said liquid feed pipe from said tank to said tower and said branch of said feed pipe, a vapor flow rate detector in said vapor pipe from said tank to said tower, a flow controller operatively connected to said vapor flow rate detector and to said heater, a flow recorder controller, a ratio controller, said last two controllers being operatively connected to said flow controller operatively connected to said flow rate detector in said pipe for feeding fractionation feed to said tank to reset same responsive to flow detected by said flow rate detector last mentioned.

2. A method of fractionating a mixed liquid and vapor feed and automatically maintaining a pre-set mol ratio of vapor and liquid to a fractionation zone in which said feed is being fractionated which comprises passing said feed at a flow rate which is measured through a controlled heating zone, detecting the temperature of said feed when it has passed through said heating zone, passing said feed to a liquid-vapor separation zone, removing liquid from said last zone and passing said liquid to the fractionation zone by way of a plurality of liquid feed entries to said fractionation zone at different levels therein, adjusting the amount of liquid fed to said fractionation zone through any of said entries responsive to the temperature earlier detected, removing vapor from said separation zone and passing said removed vapor to said fractionation zone, controlling the liquid level in said separation zone by adjusting the rate of flow of vapors from said separation zone to said fractionation zone, detecting the rate of flow of vapors from said zone to said fractionation zone, controlling heat input of said heater responsive to said rate of flow of vapors and resetting the control of heat input responsive to said flow rate of the feed which is measured.

3. A method of fractionating a mixed liquid and vapor feed and automatically maintaining a pre-set mol ratio of vapor and liquid to a fractionation zone in which said feed is being fractionated which comprises passing said feed at a flow rate which is measured through a controlled heating zone, detecting the temperature of said feed when it has passed through said heating zone, passing said feed to a liquid-vapor separation zone, removing liquid from said last zone and passing said liquid to the fractionation zone by way of a plurality of liquid feed entries to said fractionation zone at different levels therein, increasing the amount of liquid fed to a higher level of said fractionation zone when the temperature detected decreases and vice versa, removing vapor from said separation zone and passing said removed vapor to said fractionation zone, controlling the liquid level in said separation zone by increasing the rate of flow of vapors from said separation zone to said fractionation zone when the level in said separation zone decreases and vice versa, detecting the rate of flow of vapors from said separation zone to said fractionation zone and increasing the heat input to said heating zone when said rate of flow of vapors from said separation zone decreases and vice versa and resetting the control of said heat input responsive to said flow rate of feed which is measured to reestablish the original pre-set mol ratio.

4. A method of fractionating a mixed liquid and vapor feed and automatically maintaining a pre-set mol ratio of vapor and liquid to a fractionation zone in which said feed is being fractionated which comprises passing said feed at a flow rate which is measured through a controlled heating zone, detecting the temperature of said feed when it has passed through said heating zone, passing said feed to a liquid-vapor separation zone, removing liquid from said last zone and passing said liquid to the fractionation zone, removing vapor from said separation zone and passing said removed vapor to said fractionation zone, controlling the liquid level in said separation zone by adjusting the rate of flow of vapors from said separation zone to said fractionation zone, detecting the rate of flow of vapors from said zone to said fractionation zone, controlling heat input of said heater responsive to said rate of flow of vapors and resetting the control of heat input responsive to said flow rate of the feed which is measured.

References Cited in the file of this patent

UNITED STATES PATENTS

| | | |
|---|---|---|
| 2,357,113 | Houghland et al | Aug. 29, 1944 |
| 2,419,528 | Biegel | Apr. 29, 1947 |
| 2,593,931 | Stearns | Apr. 22, 1952 |
| 2,754,246 | Brosamer | July 10, 1956 |